Patented Oct. 3, 1933

1,928,648

UNITED STATES PATENT OFFICE 1,928,648

METHOD OF MAKING DISPERSIONS OF INSOLUBLE COMPOUNDS

George Holland Ellis, Henry Charles Olpin, and Ernest William Kirk, Spondon, near Derby, England, assignors to Celanese Corporation of America, a corporation of Delaware No Drawing. Original application September 4, 1929, Serial No. 390,423, and in Great Britain September 8, 1928. Divided and this application May 5, 1931. Serial No. 535,299

24 Claims. (Cl. 8—6)

This invention relates to the preparation of dispersions and to the dyeing, printing, stencilling, or otherwise colouring of materials made of or containing organic derivatives of cellulose.

In U. S. application Sr. No. 390,423 filed 4th September, 1929, of which this is a divisional application, there is described a manufacture of water-soluble sulphonated condensation products of furfural or its derivatives with a sulphonated aromatic carbocyclic or heterocyclic compound. These bodies are obtained by the condensation of furfural or derivatives thereof with aromatic compounds, whether carbocyclic or heterocyclic, and the sulphonation of the products if they do not already contain sulphonic groups or if they contain a proportion of sulphonic groups insufficient to give them the desired solubility.

The condensation to make these products may be effected in various ways depending on the nature of the parent materials; for instance it may be carried out in the presence of substances of acid or alkaline nature, for example an acid such as sulphuric acid or an alkali such as sodium carbonate. When an aromatic sulphonic acid is to be used the preparation thereof may often conveniently be combined with the condensation with the furfural or the like. Thus an aromatic compound may be sulphonated with sulphuric acid of suitable strength and then condensed with furfural in the same solution, if necessary after suitable adjustment of the strength and temperature of the acid; or the sulphonation of the aromatic compound may be effected simultaneously with the condensation, for example a mixture of an aromatic compound and furfural may be heated with concentrated sulphuric acid or other sulphonating agent.

For the sulphonation or further sulphonation of the products, when necessary, there may be employed any suitable sulphonating agent such as concentrated or fuming sulphuric acid or chlorosulphonic acid.

Among the aromatic compounds which may be used in the manufacture of these products may be mentioned aromatic hydrocarbons or heterocyclic aromatic compounds, especially di- or poly-cyclic compounds for example naphthalene, anthracene or carbazole, or crude products containing such hydrocarbons or heterocyclic compounds, aromatic hydroxy compounds or crude products containing them, halogenated aromatic compounds, or the sulphonic acids of any of them, but the invention is not restricted thereto.

As derivatives of furfural which may be employed may be mentioned methyl furfural and furfuramide.

The new products in the form of the free acids or their alkali or ammonium salts are readily soluble in water yielding solutions of a colloidal nature and have been found to be valuable dispersing and wetting agents.

According to the present invention the sulphonated condensation products prepared according to U. S. application Ser. No. 390,423 are employed for making dispersions of insoluble substances, for example insoluble aromatic compounds, particularly colouring matters, and these dispersions utilized in the colouration of materials made of our containing organic derivatives of cellulose. The term "insoluble" as used in the description and appendant claims in referring to substances to be dispersed, includes substances which are difficulty soluble.

The dispersion may be effected for example, by mixing or grinding the insoluble or difficulty soluble substances with the dispersing agent in the presence or absence of water, or by forming, liberating, or precipitating them in the presence of the dispersing agent, whereby preparations in liquid, paste, solid, or powdered form may be produced as required. The dispersing action may also be assisted by the application of heat. The aqueous preparations may, if desired, be treated for the removal of part or the whole of the water by evaporation or otherwise. Other protective colloids may be added to the preparations in order to increase their stability or for other purposes.

In some cases, and particularly when dispersions of insoluble organic compounds, for example insoluble colouring matters, are required, the dispersing action may be assisted by the addition of an auxiliary substance capable of exerting a solvent action on the compound to be dispersed, for instance the auxiliary solvents specified in U. S. patent specifications Nos. 1,690,481 and 1,803,008, in connection with insoluble or difficultly soluble colouring matters for cellulose acetate.

The new condensation products, as indicated above, are also applicable as wetting agents. They may, for example, be added to any liquids to facilitate the wetting of textile and other materials or substances therewith, or be mixed with dry powdered substances or the like to facilitate wetting, solution, dispersion, or the like on treatment with liquids.

The new condensation products have the advantage of very good solubility and very good stability in the presence of acids or of calcium or other salts present in hard water. In the solid state they form white to grey powders, and as previously indicated, dissolve in water yielding solutions of a colloidal nature.

Further, according to the invention, the colouration of materials made of or containing cellulose esters, for example cellulose acetate, or cellulose ethers, is effected by a process comprising the application thereto by dyeing, printing, stencilling or otherwise, of insoluble or difficulty soluble organic compounds or colouring matters which have affinity for cellulose esters or ethers and which have been converted into finely dispersed form by the new process, namely, by treatment with an agent comprising one or more of the aforesaid new condensation products.

The dispersions of the organic compounds or colouring matters may be produced in the dyebaths, printing pastes, etc., themselves or may be prepared from more concentrated liquid, paste, solid, or powdered preparations containing the substances and dispersing agent by suitable dilution with water with or without addition of further quantities of dispersing agent and/or protective colloids.

Any insoluble or difficultly soluble colouring matter or organic compound having an affinity for the cellulose ester or ether material under treatment or capable of colouring the same may be utilized for the purpose of the present processes. In the case of dyeing by the azoic or development process, the base may be applied first diazotized on the material and developed, or the developer component may be applied first and the colour formed by treatment with a suitable diazo-solution, or the base and developer components may be applied separately or together and the colour produced by subsequent diazotization on the material. Either the base, or the developer, or both may be applied in the form of dispersions obtained with the aid of the new dispersing agents. As instances of suitable bodies may be mentioned the colouring matters or organic compounds or classes of colouring matters or compounds referred to in United States patent specifications Nos. 1,618,413, 1,545,819, 1,600,277, 1,641,965, 1,618,415, 1,694,414, 1,679,935, and British Patents Nos. 239,470, 263,260 and 283,081, the colouring matters of British Patents Nos. 299,349 and 300,929, containing one or more keto-acidyl groups and particularly acetoacetyl groups, the nitro-diarylamines specified in British Patent No. 305,560, the unsulphonated thiazole derivatives of British Patent No 306,981, the azo dyes containing the xanthene or thioxanthene nucleus of British Patent No. 311,433, and the azo dyes of British Patent No. 310,827 containing the anthraquinone nucleus.

Though the process of the invention has been more particularly described with reference to the colouring of cellulose acetate it is also applicable to the colouration of materials made of or containing other cellulose esters such for example as cellulose formate, propionate, or butyrate, or the products obtained by the treatment of alkalized cellulose with esterifying agents (e. g. the product known as immunized cotton obtained by means of p-toluene-sulphochloride), or made of or containing cellulose ethers such as methyl, ethyl, or benzyl cellulose, or the corresponding condensation products of cellulose and glycols or other polyhydric alcohols. When the processes of the present invention are applied to the dyeing or otherwise colouring of mixed materials comprising in addition to cellulose acetate or other cellulose esters or ethers, fibres such as silk, wool, or cotton or other cellulosic fibres, natural or artificial, the said other fibres may be dyed with other dyestuffs before, after or together with the cellulose ester or ether portion and in the same or contrasting shades according to the choice of dyestuffs made and the affinity of the respective fibres therefor.

The following examples illustrate the preparation of dispersing agents for use in preparing the dispersions of the present invention, but are not to be regarded as in any way limitative:—

Example A 500 parts of naphthalene are mixed with 500 parts of sulphuric acid 95%, and heated slowly to 160° C. and kept at this temperature for 10 hours The mixture is cooled to 50° C. and 150 parts of water added so that the temperature does not rise above 85° C. At this temperature 150 parts of furfural are added, and the mixture immediately heated to 100° C. and kept at this temperature for 4 to 6 hours. The batch is then cooled, and diluted with 300 parts of water, and partly neutralized with 200 parts of 40% caustic soda solution. The furfural-naphthalene sulphonic acid then separates on standing, and is filtered, washed and dried.

Example B 500 parts of benzene are sulphonated with 1100 parts of sulphuric acid in the usual manner, and the sulphonation mixture is cooled to 50-60° C. and 75 parts of furfural dropped in slowly. The temperature is then raised to 100° for 2 hours, and the whole poured on to 3000 parts of crushed ice, partly neutralized with 1000 parts of 30% caustic soda solution, 500 parts of salt added and the mixture allowed to cool. The furfural benzene sulphonic acid then separates and is filtered off, washed and dried.

Example C 500 parts of phenol are sulphonated with 1,400 parts of sulphuric acid at 110° C. until it is quite soluble in cold water. After cooling to 70-80° C. 50 parts of furfural are dropped in, and the whole stirred at 100° C. for 2 hours. The mixture is then run to 3,000 parts of ice, partly neutralized with 1,000 parts of 30% caustic soda solution, 500 parts of salt added and the separated furfural phenol sulphonate filtered off, washed and dried.

The following examples illustrate the production of colourations on cellulose derivative materials in accordance with the present invention, but are not to be regarded as in any way limitative:—

Example 1

To obtain a blue shade on 100 lbs. of cellulose acetate knit fabric, 1 lb. of diaminoanthrarufin is mixed by dry grinding with 3 lbs. of the sodium salt of furfural-naphthalene-sulphonic acid and the whole well stirred into 10 gallons of boiling water. The dispersion of the dyestuff thus obtained is strained into the dyebath containing 300 gallons of water. The goods are entered at 25-30° C. and the bath raised slowly to 75-80° C. and worked at this temperature until the required shade is obtained. The goods are then carefully lifted, rinsed and otherwise treated as requisite.

Example 2

To obtain a yellow shade on 100 lbs. of cellulose acetate knit fabric, 10 lbs. of a 10% paste of 2:4 dinitro-diphenylamine milled to as fine a state of division as possible are added to a bath containing 5 lbs. of the sodium salt of furfural-naphthalene-sulphonic acid in 280 gallons of water. The goods are entered at 30° C. and while being worked the temperature of the bath is raised to 75° C. and kept at this for an hour. The goods are then lifted, rinsed and dried or otherwise treated as desired.

By the term "colouring matter compound" employed in the claims is meant compounds which are themselves colouring matters or which can be converted into colouring matters on the fibre.

What we claim and desire to secure by Letters Patent is:—

1. Process for the manufacture of dispersions of insoluble substances which comprises treating said substances with an agent comprising a water-soluble sulphonated condensation product of a compound containing at least one aromatic nucleus capable of sulphonation with a compound selected from the group consisting of furane aldehydes and their amides.

2. Process for the manufacture of dispersions of insoluble colouring matter compounds which comprises treating said compounds with an agent comprising a water-soluble sulphonated condensation product of a compound containing at least one aromatic nucleus capable of sulphonation with a compound selected from the group consisting of furane aldehydes and their amides.

3. Process for the manufacture of dispersions of insoluble substances which comprises treating said substances with an agent comprising a water-soluble sulphonated condensation product of a sulphonated aromatic compound with a compound selected from the group consisting of furane aldehydes and their amides.

4. Process for the manufacture of dispersions of insoluble substances which comprises treating said substances with an agent comprising a water-soluble sulphonated product obtained by condensation of a compound selected from the group consisting of furane aldehydes and their amides with a compound containing at least one aromatic nucleus capable of sulphonation in the presence of sulphuric acid.

5. Process for the manufacture of dispersions of insoluble substances which comprises treating said substances with an agent comprising a water-soluble sulphonated condensation product obtained by condensation of a sulphonated aromatic compound with a compound selected from the group consisting of furane aldehydes and their amides in the presence of sulphuric acid.

6. Process for the manufacture of dispersons of insoluble substances which comprises forming said substances in the presence of an agent comprising a water-soluble sulphonated condensation product of a compound containing at least one aromatic nucleus capable of sulphonation with a compound selected from the group consisting of furane aldehydes and their amides.

7. Process for the manufacture of dispersions of insoluble substances which comprises treating said substances with an agent comprising a water-soluble sulphonated condensation product obtained by condensation of naphthalene with a compound selected from the group consisting of furane aldehydes and their amides in the presence of sulphuric acid.

8. Process for the manufacture of dispersions of insoluble substances which comprises treating said substances with an agent comprising a water-soluble sulphonated condensation product obtained by condensation of sulphonated naphthalene with a compound selected from the group consisting of furane aldehydes and their amides in the presence of sulphuric acid.

9. Process for the manufacture of dispersions of insoluble substances which comprises treating said substances with an agent comprising a water-soluble salt of a sulphonated condensation product of a compound containing at least one aromatic nucleus capable of sulphonation with a compound selected from the group consisting of furane aldehydes and their amides.

10. Compositions of matter comprising insoluble substances together with water-soluble sulphonated condensation products of compounds containing at least one aromatic nucleus capable of sulphonation with compounds selected from the group consisting of furane aldehydes and their amides.

11. Compositions of matter comprising insoluble organic compounds together with water-soluble sulphonated condensation products of compounds containing at least one aromatic nucleus capable of sulphonation with compounds selected from the group consisting of furane aldehydes and their amides.

12. Compositions of matter comprising insoluble substances together with water-soluble condensation products of sulphonated naphthalene with compounds selected from the group consisting of furane aldehydes and their amides.

13. Compositions of matter comprising insoluble organic compounds together with water-soluble condensation products of sulphonated naphthalene with compounds selected from the group consisting of furane aldehydes and their amides.

14. Compositions of matter comprising insoluble colouring matters together with water-soluble sulphonated condensation products of compounds containing at least one aromatic nucleus capable of sulphonation with compounds selected from the group consisting of furane aldehydes and their amides.

15. Compositions of matter comprising insoluble colouring matter compounds together with water-soluble condensation products of sulphonated aromatic compounds with compounds selected from the group consisting of furane aldehydes and their amides.

16. Compositions of matter comprising insoluble colouring matters together with water-soluble sulphonated condensation products of naphthalene with compounds selected from the group consisting of furane aldehydes and their amides.

17. Compositions of matter comprising insoluble colouring matters together with water-soluble condensation products of sulphonated naphthalene with compounds selected from the group consisting of furane aldehydes and their amides.

18. Compositions of matter comprising insoluble colouring matters together with water-soluble salts of sulphonated condensation products of compounds containing at least one aromatic nucleus capable of sulphonation with compounds selected from the group consisting of furane aldehydes and their amides.

19. Process for the colouration of materials comprising organic derivatives of cellulose which comprises applying thereto a colouring matter compound in the form of a dispersion obtained by treating the compound with a water-soluble sulphonated condensation product of a compound containing at least one aromatic nucleus capable of sulphonation with a compound selected from the group consisting of furane aldehydes and their amides.

20. Process for the colouration of materials comprising organic derivatives of cellulose which comprises applying thereto an insoluble colouring matter in the form of a dispersion obtained by treatment with a water-soluble sulphonated condensation product of a compound containing at least one aromatic nucleus capable of sulphonation with a compound selected from the group consisting of furane aldehydes and their amides.

21. Process for the colouration of materials comprising cellulose acetate which comprises applying thereto an insoluble colouring matter compound in the form of a dispersion obtained by treatment with a water-soluble sulphonated condensation product of a compound containing at least one aromatic nucleus capable of sulphonation with a compound selected from the group consisting of furane aldehydes and their amides.

22. Process for the colouration of materials comprising organic derivatives of cellulose which comprises applying thereto an insoluble colouring matter in the form of a dispersion obtained by treatment with a water-soluble condensation product of sulphonated naphthalene with a compound selected from the group consisting of furane aldehydes and their amides.

23. Process for the colouration of materials comprising cellulose acetate which comprises applying thereto an insoluble colouring matter in the form of a dispersion obtained by treatment with a water-soluble condensation product of sulphonated naphthalene with a compound selected from the group consisting of furane aldehydes and their amides.

24. Process for the colouration of materials comprising organic derivatives of cellulose which comprises applying thereto a colouring matter in the form of a dispersion obtained with the aid of a salt of a water-soluble sulphonated condensation product of a compound containing at least one aromatic nucleus capable of sulphonation with a compound selected from the group consisting of furane aldehydes and their amides.

GEORGE HOLLAND ELLIS.
HENRY CHARLES OLPIN.
ERNEST WILLIAM KIRK.